US011946284B2

(12) United States Patent
Lin et al.

(10) Patent No.: US 11,946,284 B2
(45) Date of Patent: Apr. 2, 2024

(54) DOOR LOCK CAPABLE OF SHOWING LOCKING OR UNLOCKING STATE

(71) Applicant: Oak Security Group LLC, Indianapolis, IN (US)

(72) Inventors: Chung-Liang A Lin, Tianan (TW); Roger K. Russell, Indianapolis, IN (US); Mark A. Shumaker, Indianapolis, IN (US)

(73) Assignee: Oak Security Group, LLC, Indianapolis, IN (US)

( * ) Notice: Subject to any disclaimer, the term of this patent is extended or adjusted under 35 U.S.C. 154(b) by 980 days.

(21) Appl. No.: 16/383,756

(22) Filed: Apr. 15, 2019

(65) Prior Publication Data

US 2020/0270900 A1 Aug. 27, 2020

(30) Foreign Application Priority Data

Feb. 22, 2019 (TW) ................................ 108106065

(51) Int. Cl.
*E05B 17/10* (2006.01)
*E05B 13/10* (2006.01)
*E05B 41/00* (2006.01)

(52) U.S. Cl.
CPC ............ *E05B 17/10* (2013.01); *E05B 13/108* (2013.01); *E05B 41/00* (2013.01); *E05Y 2900/132* (2013.01)

(58) Field of Classification Search
CPC ........ E05B 17/10; E05B 41/00; E05B 1/0084; E05B 13/04; E05B 13/108
USPC .................................. 70/224, 473, 477, 483
See application file for complete search history.

(56) References Cited

U.S. PATENT DOCUMENTS 1,841,570 A * 1/1932 Burkholder ............ E05B 17/10 362/100
2,308,844 A * 1/1943 Wilshusen ............... B60Q 1/34 362/540
2,726,891 A * 12/1955 Gresham ............... E05B 55/005 292/337
3,803,575 A * 4/1974 Gotanda ............... E05B 45/083 340/522

(Continued)

FOREIGN PATENT DOCUMENTS

DE 29905827 U1 * 7/1999 ............ E05B 17/10
DE 10339601 A1 * 3/2005 ............... E05B 1/00

(Continued)

*Primary Examiner* — Carlos Lugo
(74) *Attorney, Agent, or Firm* — Indiano Law Group LLC.; E. Victor Indiano; John T. Woods

(57) ABSTRACT

A door lock includes a latch driving device having a thumb turn that can be switched between a locking position not permitting movement of a latch to an unlatching position when an outer handle is pivoted and an unlocking position permitting movement of the latch to unlatching position when the outer handle is pivoted. The thumb turn includes an actuator controlling a switch to a conductive state or a non-conductive state. When the thumb turn is in the locking position, the switch is in the conductive state, and a lighting element controlled by the switch generates light transmitting through the first lid. When the thumb turn is in the unlocking position, the switch is in the non-conductive state, and the lighting element does not generate light. Thus, the locking or unlocking state of the door lock can be identified by sight.

6 Claims, 9 Drawing Sheets

(56) References Cited

U.S. PATENT DOCUMENTS

| | | | | | |
|---|---|---|---|---|---|
| 4,201,069 | A * | 5/1980 | Katayama | E05B 17/0062 | 70/224 |
| 4,683,741 | A * | 8/1987 | Fields | E05B 17/10 | 109/38 |
| 4,904,005 | A * | 2/1990 | Frolov | E05B 45/06 | 292/144 |
| 4,921,289 | A * | 5/1990 | Shen | E05B 55/005 | 292/336.3 |
| 5,177,987 | A * | 1/1993 | Shen | E05B 55/005 | 292/336.3 |
| 5,179,325 | A * | 1/1993 | Aragon, Jr. | E05B 17/10 | 315/129 |
| 5,398,175 | A * | 3/1995 | Pea | E05B 17/10 | 315/84 |
| 5,765,884 | A * | 6/1998 | Armbruster | E05B 81/20 | 292/1 |
| 5,865,049 | A * | 2/1999 | Friedrich | E05B 17/22 | 70/264 |
| 5,878,610 | A * | 3/1999 | Friedrich | E05B 17/22 | 70/264 |
| 6,575,006 | B1 * | 6/2003 | Don | E05B 13/101 | 70/149 |
| 6,993,945 | B1 * | 2/2006 | Chen | E05B 13/101 | 292/DIG. 27 |
| 7,270,452 | B2 * | 9/2007 | Wang | B60Q 1/2669 | 362/501 |
| 7,455,437 | B2 * | 11/2008 | Shi | B60Q 1/2669 | 296/1.02 |
| 7,866,195 | B2 * | 1/2011 | Levine | E05B 41/00 | 70/432 |
| 8,590,949 | B2 * | 11/2013 | Wang | E05B 13/004 | 292/336.3 |
| 8,939,477 | B2 * | 1/2015 | Welsby | E05B 13/101 | 292/347 |
| 10,563,425 | B2 * | 2/2020 | Lunday | E05B 1/003 | |
| 2003/0063009 | A1 * | 4/2003 | Pelletier | E05B 41/00 | 340/686.1 |
| 2004/0237255 | A1 * | 12/2004 | Lin | E05B 1/0069 | 16/110.1 |
| 2021/0079688 | A1 * | 3/2021 | Shumaker | E05B 41/00 | |

FOREIGN PATENT DOCUMENTS

| | | | | |
|---|---|---|---|---|
| GB | 2216948 | A * | 10/1989 | E05B 17/10 |
| GB | 2429747 | A * | 3/2007 | E05B 17/10 |
| KR | 101477903 | B1 * | 12/2014 | |
| WO | WO-2005083321 | A1 * | 9/2005 | E05B 17/10 |

* cited by examiner

DOOR LOCK CAPABLE OF SHOWING LOCKING OR UNLOCKING STATE

BACKGROUND OF THE INVENTION

The present invention relates to a door lock and, more particularly, to a door lock capable of showing a locking or unlocking state thereof.

A door lock generally includes a latch engaged with a latch hole of a door frame when the door is in the closed position. The door lock can be switched between a locking state and an unlocking state. In the locking state, the latch cannot be retracted to an unlatching position when an outer handle mounted to an outer side of the door is operated. On the other hand, in the unlocking state, the latch can be retracted to the unlatching position when the outer handle is operated, permitting opening of the door. A press button or a thumb turn can be disposed on an inner handle to permit rapid setting to the locking state. A user can be visually aware of the locking state or unlocking state of the door lock by the position of the press button or the thumb turn. However, it is not easy to identify whether the press button is pressed (which sets the door lock to the locking state). Although it is easier to identify the extending direction of the thumb turn, the user has to remember which extending direction of a stem of the thumb turn (in the horizontal or vertical direction) is the locking state.

BRIEF SUMMARY OF THE INVENTION

In a first aspect, a door lock according to the present invention includes a latch driving device having an inner operating device and an outer operating device coupled with the inner operating device. A latching device is coupled with the inner operating device and the outer operating device. The latching device includes a latch movable between an unlatching position and a latching position. An outer handle is operatively coupled to an outer side of the outer operating device. The outer handle is pivotable to move the latch to the unlatching position. An inner handle includes a shank interlocked with the inner operating device and a lever extending from the shank. The shank includes a pivotal hole extending from an end face thereof. The lever includes an outer groove in an outer surface thereof the shank and a chamber intercommunicating with the outer groove. A lighting device is received in the chamber of the inner handle. The lighting device includes a lighting element facing the outer surface and a switch controlling lighting of the lighting element. A first lid is transmittable to light and is mounted in the outer groove. The lighting element is configured to generate light transmitting through the first lid. A thumb turn is pivotably coupled with the pivotal hole of the inner handle and interlocked with the latch driving device. The thumb turn includes an actuator controlling the switch to a conductive state or a non-conductive state. The thumb turn is pivotable between a locking position in which the latch is not moved when the outer handle is operated and an unlocking position in which the latch is movable to the unlatching position when the outer handle is operated. When the thumb turn is in the locking position, the switch is in the conductive state, and the lighting element generates light transmitting through the first lid. When the thumb turn is in the unlocking position, the switch is in the non-conductive state, and the lighting element does not generate light.

The thumb turn is used to control lighting of the plurality of lighting elements, such that the user can easily identify whether the door lock is in the locking or unlocking state by sight, providing use convenience.

In an example, the door lock further includes an actuator in the form of a permanent magnet. The thumb turn includes a stem and a pivotal portion extending from the stem. The thumb turn further includes a receptacle in the pivotal portion. The actuator is securely mounted in the receptacle. The switch is a reed switch. When the thumb turn is in the unlocking position, the actuator is aligned with the switch, and the switch is set to the non-conductive state. When the thumb turn is in the locking position, the actuator is spaced from the switch in a circumferential direction about a pivotal axis defined by the pivotal hole, and the switch is set to the non-conductive state.

In an example, the door lock further includes a positioning member. The inner handle further includes two positioning grooves in an inner periphery of the pivotal hole. The thumb turn further includes a receiving hole provided in the pivotal portion and spaced from the receptacle. The positioning member is received in the receiving hole and is biased to move outward of the receiving hole. The thumb turn is in the unlocking position. The positioning member engages with one of the two positioning grooves, thereby positioning the thumb turn in the unlocking position. When the thumb turn is in the locking position, the positioning member engages with another of the two positioning grooves, thereby positioning the thumb turn in the locking position.

In an example, the door lock further includes a second lid. The inner handle further includes an inner surface spaced from the outer surface. The inner handle further includes an inner groove extending from the inner surface to the chamber. The first lid further includes two engaging portions on an inner side thereof. The two engaging portions extend through the chamber and abut an inner side of the second lid. Two fasteners extend through the second lid and threadedly engage with the two engaging portions, respectively.

In an example, the inner handle further includes a through-hole extending between the pivotal hole and the chamber. The switch of the lighting device is received in the through-hole and is spaced from the pivotal hole.

In a second aspect, a door lock according to the present invention includes an inner operating device having an inner body and an inner spindle pivotably connected to the inner body. An outer operating device includes an outer body and an outer spindle pivotably connected to the outer body. The outer body further includes a limiting groove. The outer operating device further includes a locking member received in the outer body and movable in an axial direction of the outer spindle and a driving member interlocked with the locking member. The locking member includes a limiting block. The locking member is movable in the axial direction of the outer spindle between a non-locking position in which the limiting block disengages from the limiting groove and a locking position in which the limiting block engages with the limiting groove. A retractor is movable in a transverse direction perpendicular to the axial direction of the outer spindle. The retractor interlocks with the inner spindle and the driving member. Rotation of the inner spindle or the outer spindle moves the retractor. A latching device interlocks with the retractor and includes a latch movable between a latching position and an unlatching position. Movement of the retractor causes movement of the latch to the latching position or the unlatching position. A connecting shaft is received in the inner body and the outer body. The connecting shaft interlocks with the locking member. Pivotal movement of the connecting shaft causes movement of the locking member to the locking position or the unlocking position. An outer handle is coupled with the outer spindle. An inner handle includes a shank and a lever extending from the shank. The shank includes a pivotal hole extending from an end face thereof. The lever includes an outer groove in an outer surface thereof and a chamber intercommunicating with the outer groove. A lighting device is received in the chamber of the inner handle. The lighting device includes a lighting element facing the outer surface and a switch controlling lighting of the lighting element. A first lid is transmittable to light and is mounted in the outer groove. The lighting element is configured to generate light transmitting through the first lid. A thumb turn is pivotably coupled with the pivotal hole of the inner handle. The thumb turn includes an actuator controlling the switch to a conductive state or a non-conductive state. The thumb turn further includes a driving end interlocked with the connecting shaft. Pivotal movement of the thumb turn causes movement of the connecting shaft to control the locking member to the locking position or the unlocking position. When the locking member is in the locking position, the switch is in the conductive state, and the lighting element generates light transmitting through the first lid. When the locking member is in the unlocking position, the switch is in the non-conductive state, and the lighting element does not generate light.

In an example, the connecting shaft includes an inner shaft portion and an outer shaft portion. The inner shaft portion is pivotably received in the inner spindle and including a coupling end. The driving end of the thumb turn interlocks with the inner shaft portion. The outer shaft portion is pivotably received in the locking member and is movable in the axial direction of the outer spindle. The outer shaft portion includes a connecting end interlocked with the coupling end of the inner shaft portion. The outer shaft portion interlocks with the locking member. The locking member further includes a guiding groove in an outer periphery thereof. An interlocking member includes an end coupled to the outer spindle portion and another end received in the guiding groove of the locking member. When the outer spindle portion pivots, the interlocking member is actuated to move the locking member. A lock core is mounted to the outer handle and interlocked with the outer spindle portion. When the lock core is rotated, the outer spindle portion is pivoted.

The present invention will become clearer in light of the following detailed description of illustrative embodiments of this invention described in connection with the drawings.

Figure 1:
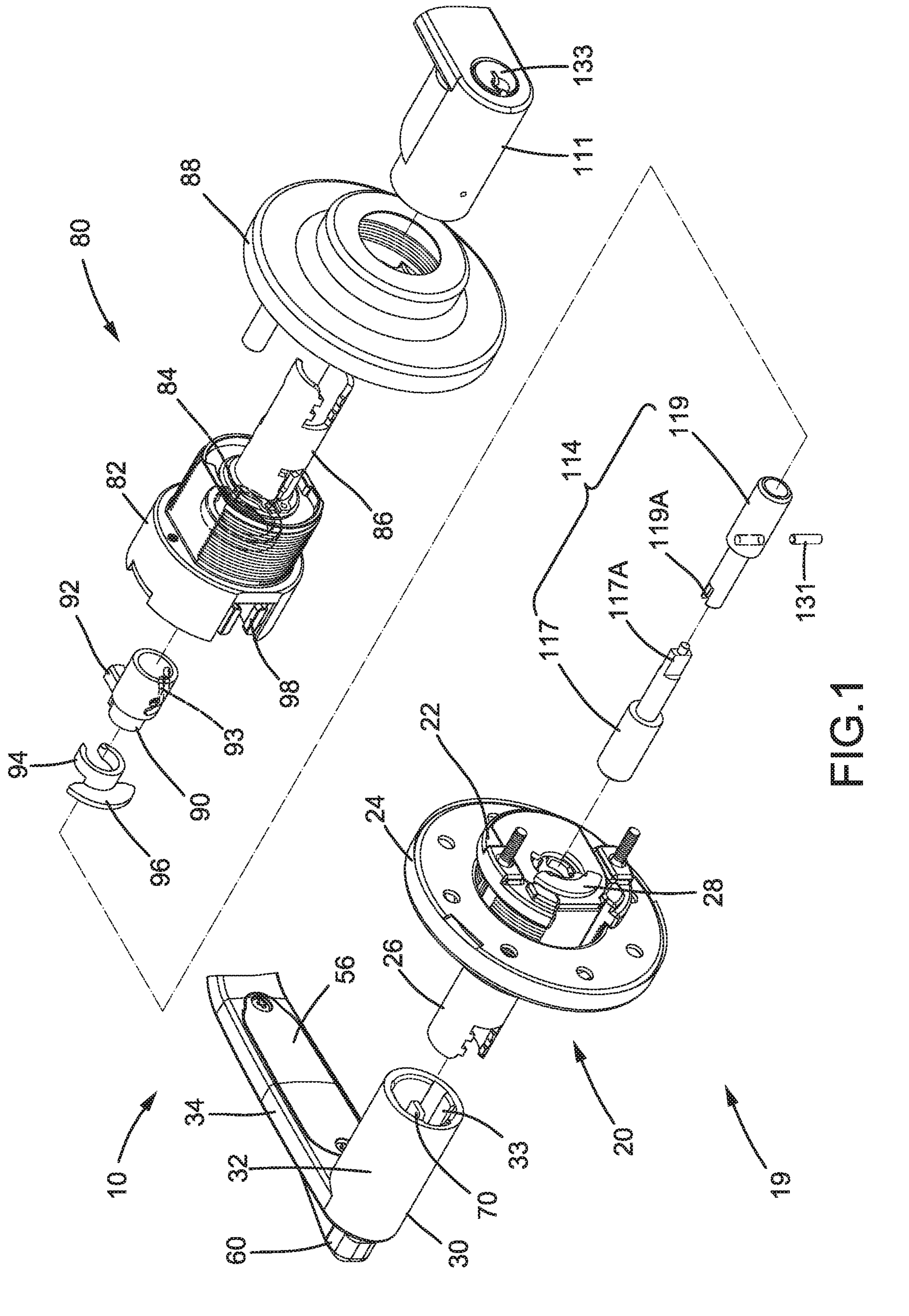
FIG. 1 is an exploded, perspective view of a door lock of an embodiment according to the present invention.

All figures are drawn for ease of explanation of the basic teachings of the present invention only, the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "side", "end", "portion", "section", "axial", "radial", "circumferential", "lateral", "horizontal", "outward", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
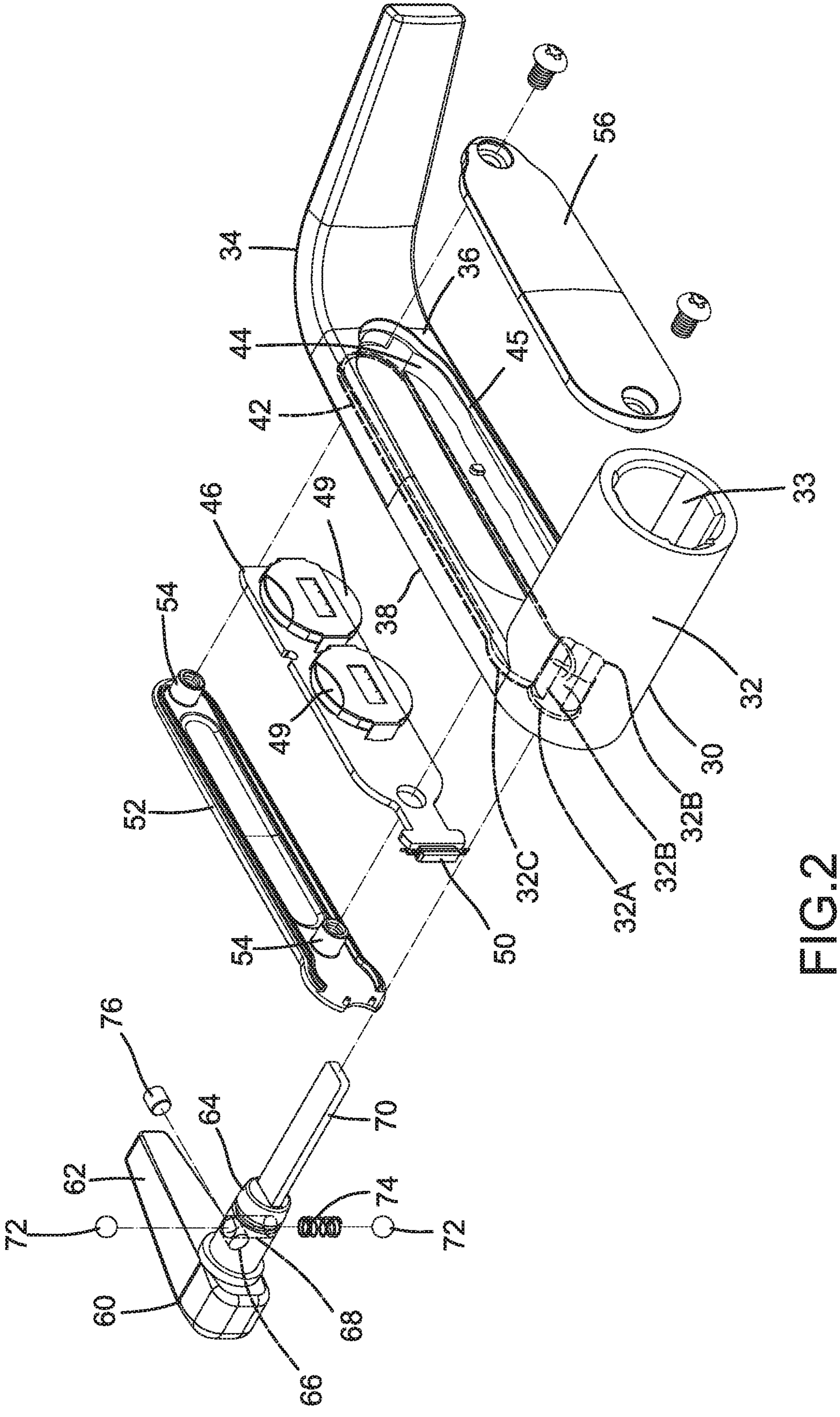
FIG. 2 is a partially exploded perspective view of the door lock of the embodiment according to the present invention.
Figure 3:
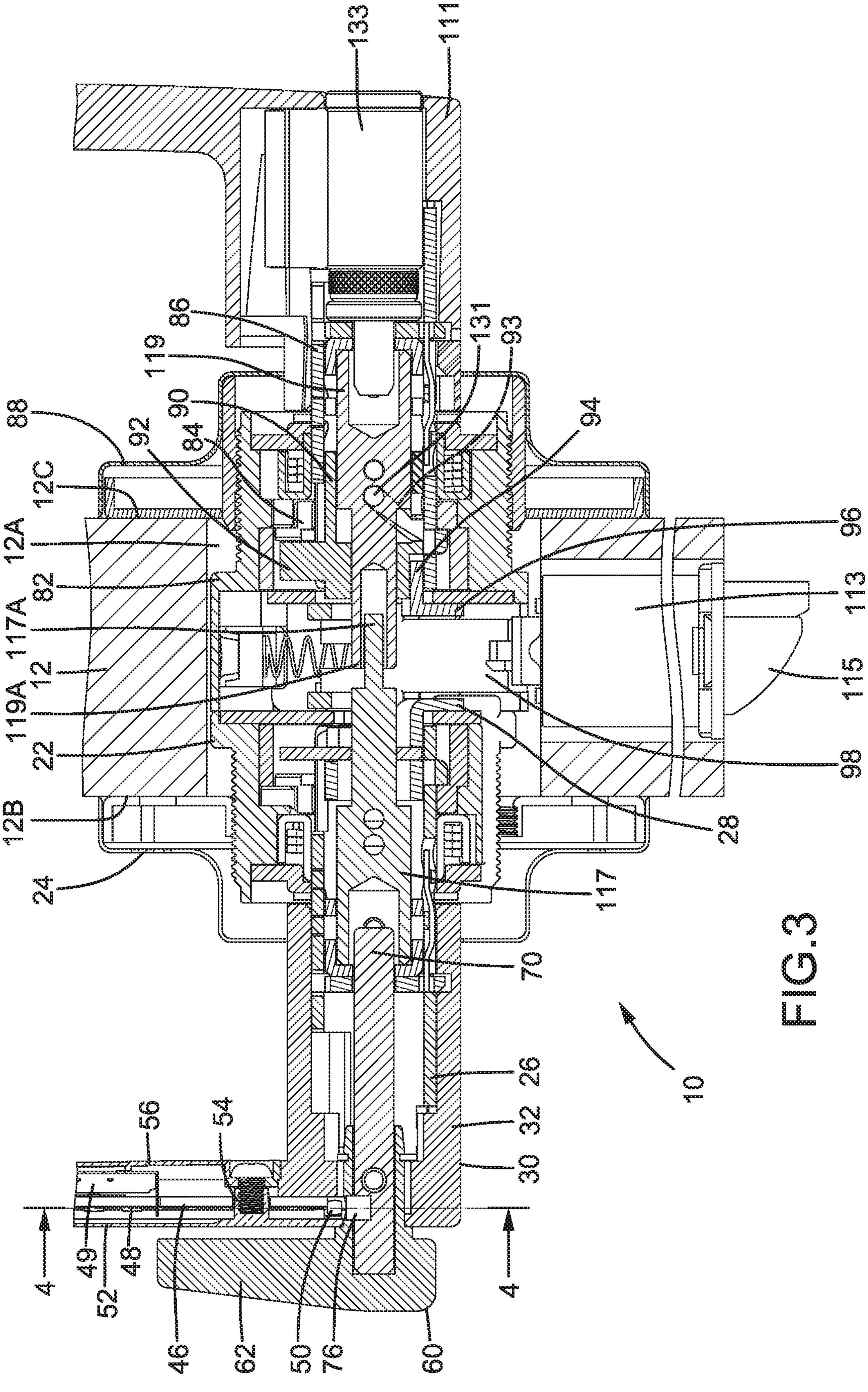
FIG. 3 is a cross sectional view of the door lock of the embodiment according to the present invention.

A door lock 10 according to the present invention is mounted to a door 12 and can prevent the door 12 from being opened in a closed state. With reference to FIGS. 1-3, the door lock 10 includes a latch driving device 19 and a latch device 113 operatively connected to the latch driving device 19. The latch driving device 19 includes an inner operating device 20 and an outer operating device 80. The inner operating device 20 includes an inner body 22 and an inner fixing member 24 threadedly coupled to an outer side of the inner body 22. A portion of the inner body 22 is received in an installation hole 12A of the door 12. The inner fixing member 24 abuts an inner side 12B of the door 12. The inner operating device 20 further includes an inner spindle 26 pivotably mounted to the inner body 22 and includes an inner lug 28.

The inner operating device 20 further includes an inner handle 30 coupled to and jointly pivotable with the inner spindle 26. The inner handle 30 includes a shank 32 and a lever 34 extending from an end of the shank 32. The shank 32 includes a pivotal hole 32A extending from an end face of the shank 32 towards but spaced from another end face of the shank 32. The shank 32 further includes a coupling hole 33 extending from the other end face of the shank 32 to the pivotal hole 32A. The inner handle 30 further includes four positioning groove 32B in an inner periphery of the pivotal hole 32A and spaced from each other by 90° about a pivotal axis defined by the shank 32. The lever 34 includes an inner surface 36 and an outer surface 38 spaced from the inner surface 36. The lever 34 further includes an outer groove 42 extending from the outer surface 38 towards but spaced from the inner surface 36. The lever 34 further includes an inner groove 45 extending from the inner surface 36 towards but spaced from the outer surface 38. The lever 34 further includes a chamber 44 extending between the inner groove 42 and the outer groove 45. The inner handle 30 further includes a through-hole 32C extending between the chamber 44 and the pivotal hole 32A. The coupling hole 33 of the shank 32 of the inner handle 30 couples with the inner spindle 26. Thus, the inner spindle 26 pivots when a user grips and pivots the lever 34 of the inner handle 30.

Figure 8:
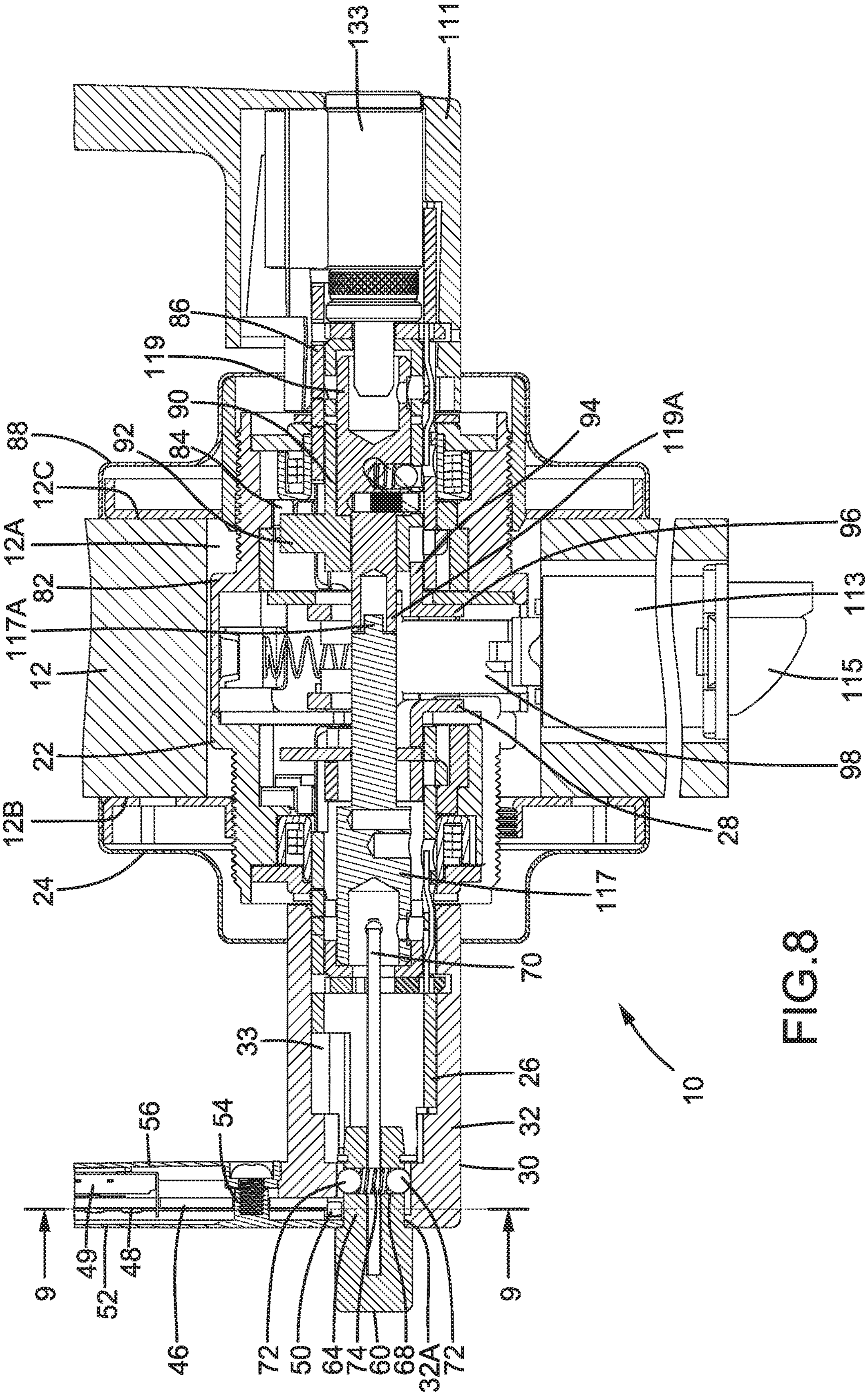
FIG. 8 is a view similar to FIG. 3, with a thumb turn pivoted to a locking position.

The inner operating device 20 further includes a thumb turn 60 pivotably connected to the inner handle 30. The thumb turn 60 includes a stem 62 and a pivotal portion 64 extending from a side of the stem 62. The thumb turn 60 further includes a driving end 70 extending from an end face of the pivotal portion 64. With reference to FIGS. 2, 3 and 8, the thumb turn 60 further includes a receptacle 66 extending in a radial direction and a receiving hole 68 spaced from the receptacle 66. An actuator 76 in the form of a permanent magnet is securely received in the receptacle 66. Two positioning members 72 in the form of balls are received in the receiving hole 68. A biasing spring 74 is mounted between the two positioning members 72 and bias the two positioning members 72 outward.

Figure 4:
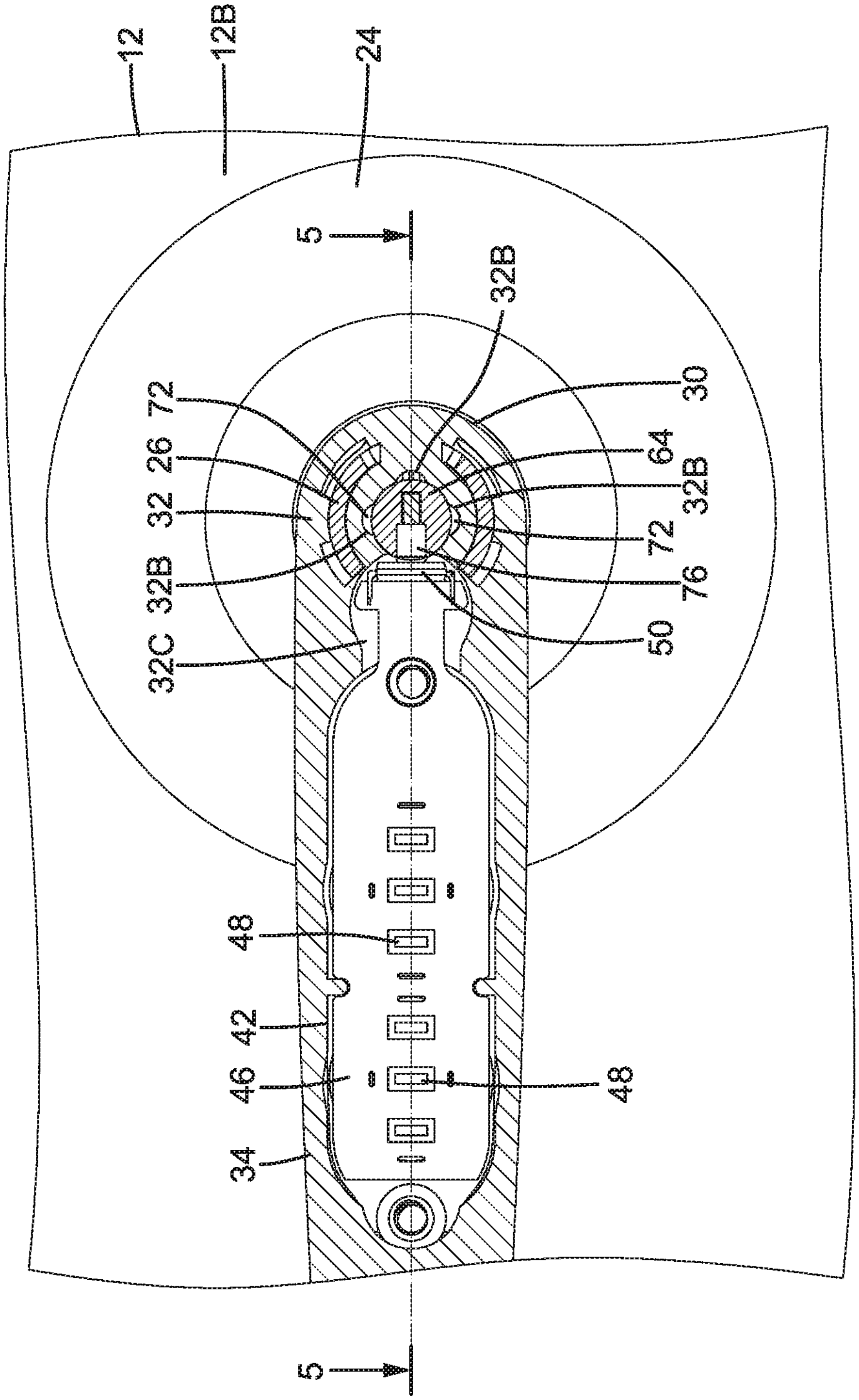
FIG. 4 is a cross sectional view taken along section line 4-4 of FIG. 3.
Figure 9:
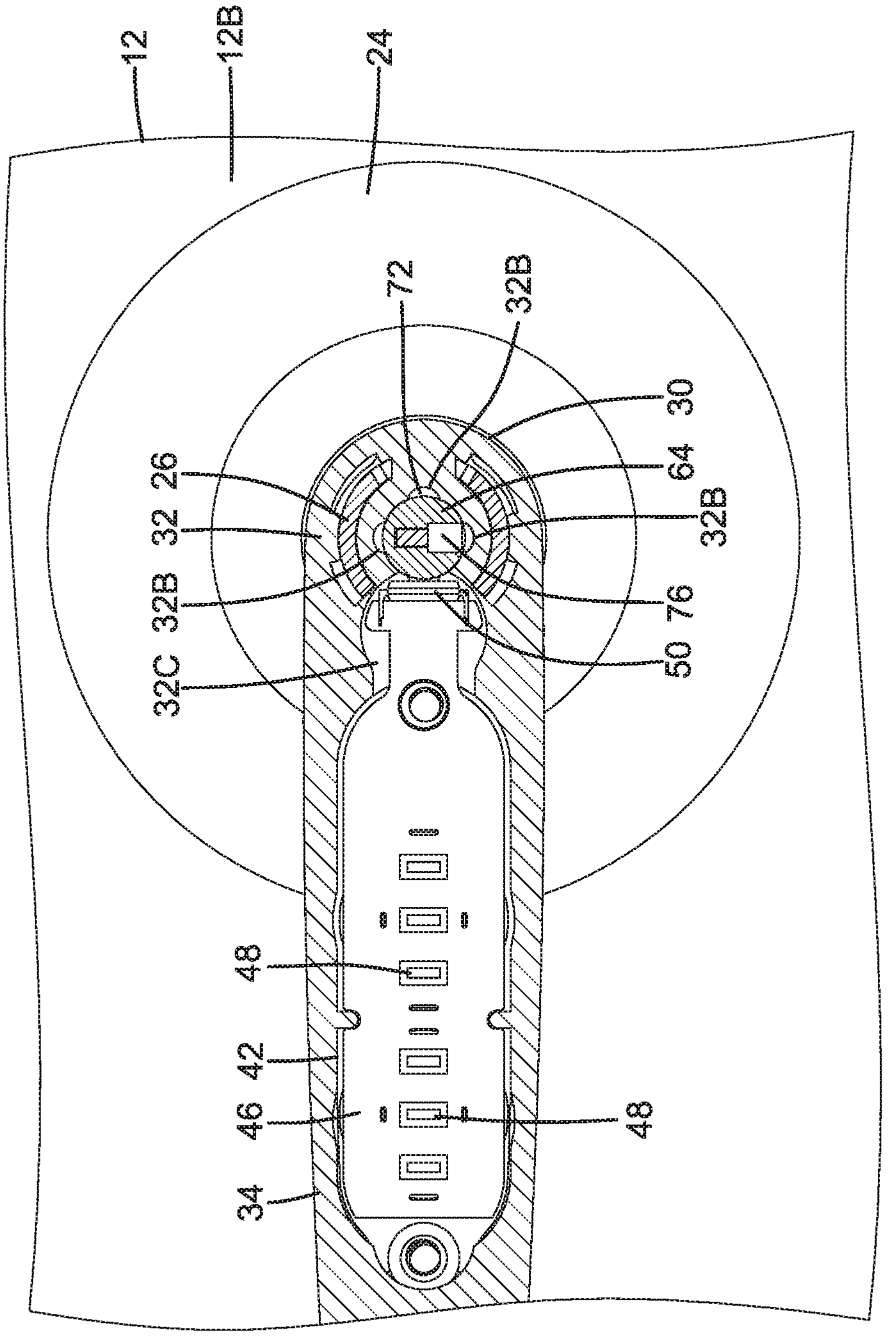
FIG. 9 is a cross sectional view taken along section line 9-9 of FIG. 8.

The pivotal portion 64 of the thumb turn 60 is pivotably coupled with the pivotal hole 32A of the inner handle 30. The driving end 70 is located in the inner spindle 26 (FIG. 3). The two positioning members 72 are retained by the inner periphery of the coupling hole 32A and, thus, cannot move out of the receiving hole 68. Furthermore, the biasing spring 74 bias the two positioning member 72 to press against the inner periphery of the pivotal hole 32A. The thumb turn 60 is pivotable between a locking position (FIG. 8) and an unlocking position (FIG. 3) about the pivotal axis defined by the pivotal hole 32A. When the thumb turn 60 is in the locking position, the two positioning members 72 engage with two of the four positioning grooves 32B, and the actuator 76 is aligned with the through-hole 32C (FIG. 4). When the thumb turn 60 is in the unlocking position, the two positioning members 72 engage with the other two of the four positioning grooves 32B, and the actuator 76 is misaligned from the through-hole 32C (FIG. 9).

A lighting device 46, a first lid 52, and a second lid 56 are mounted to the lever 34. The lighting device 46 includes a plurality of lighting elements 48 in the form of light emitting diodes (LEDs) and two batteries 49 powering the plurality of lighting elements 48. A switch 50 is mounted between the plurality of lighting element 48 and the two batteries 49 and can be in the form of a reed switch for cooperating with the actuator 76 in the form of a permanent magnet. The switch 50 can be in a conductive state in which the two batteries 49 supply electricity to the plurality of lighting elements 48 or a non-conductive state in which the two batteries 49 do not supply electricity to the plurality of lighting elements 48. When the thumb turn 60 is in the locking position, the actuator 76 is spaced from the switch 50 in a circumferential direction of the pivotal hole 32A, the switch 60 is set to the conductive state (FIG. 9), and the plurality of lighting elements 48 generates light. When the thumb turn 60 is in the unlocking position, the actuator 76 is aligned with the switch 50, the switch 60 is set to the non-conductive state (FIG. 4), and the plurality of lighting elements 48 does not generate light.

Figure 5:
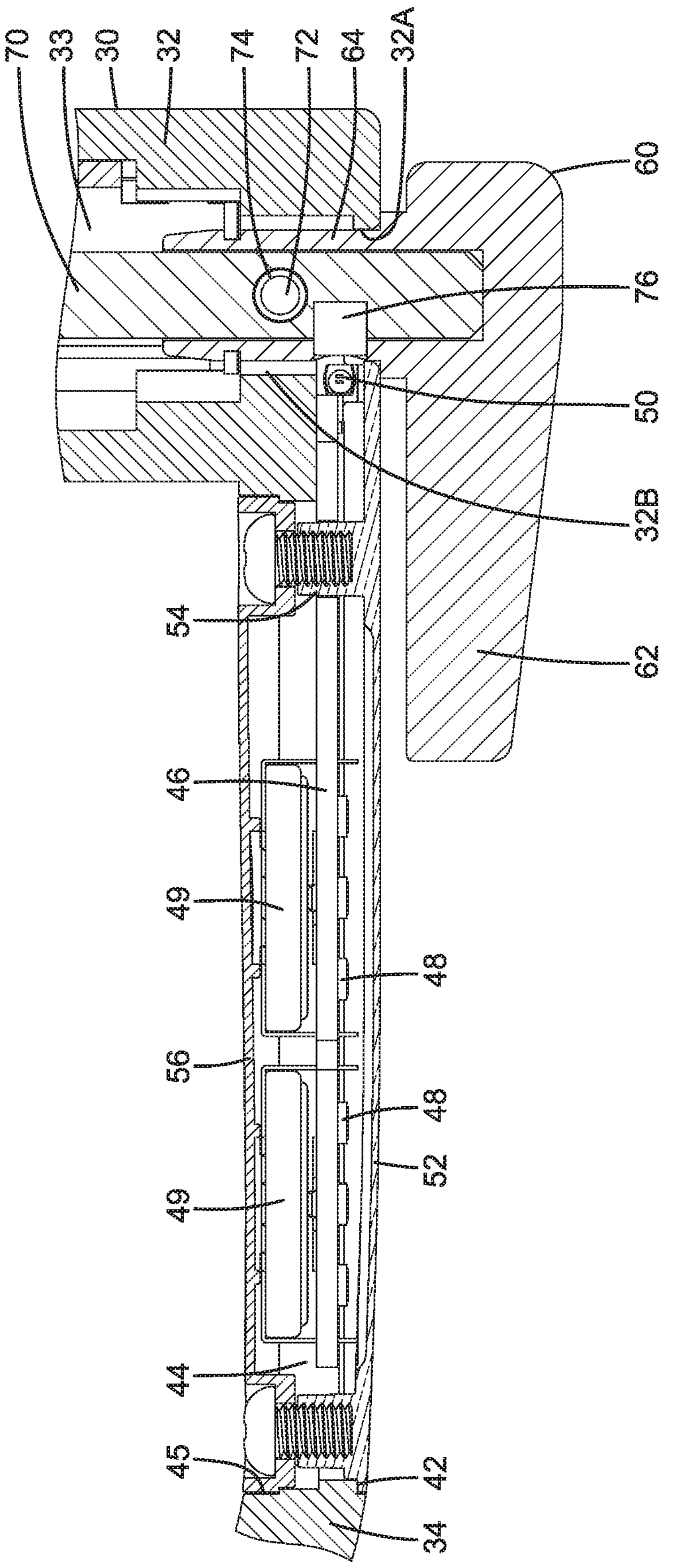
FIG. 5 is a cross sectional view taken along section line 5-5 of FIG. 4.

The first lid 52 is made of light-transmittable material and includes two engaging portions 54 on an inner side thereof. The first lid 52 is received in the outer groove 42 of the lever 34. The two engaging portions 54 extend through the lighting device 46. The second lid 56 is received in the inner groove 45 of the lever 34. The distal ends of the two engaging portions 54 abut an inner side of the second lid 56. Two fasteners 58 extend through the second lid 56 and threadedly engage with the two engaging portions 54, respectively. Thus, the lighting device 46 is securely fixed in the chamber 44 (FIG. 5).

The outer operating device 80 includes an outer body 82 coupled with the installation hole 12A of the door 12 and an outer fixing member 88 threadedly mounted to an outer side of the outer body 82. The outer body 82 includes a limiting groove 84 (FIG. 3). The outer fixing member 88 abuts the outer side 12C of the door 12 and threadedly engages with the inner fixing member 24. Thus, the inner body 22 and the outer body 82 are non-rotatably coupled to the door 12 by the inner fixing member 24 and the outer fixing member 88. The outer operating device 80 further includes an outer spindle 86 pivotably connected to the outer body 82. The outer operating device 80 further includes a locking member 90 and a driving member 94 which are mounted in the outer body 82 and which interlock with the outer spindle 86. The locking member 90 includes a limiting block 92 on an outer periphery thereof and a guiding groove 93 extending helically on the outer periphery. The locking member 90 is movable in an axial direction of the outer spindle 86 between a locking position (FIG. 8) in which the limiting block 92 engage with the limiting groove 84 of the body 82 and a non-locking position (FIG. 3) in which the limiting block 92 disengages from the limiting groove 84 of the body 82. The driving member 94 includes an outer lug 96.

The outer spindle 86 interlocks with an outer handle 111 receiving a lock core 133. The outer body 82 is coupled with the inner body 22. A retractor 98 is mounted between the inner body 22 and the outer body 82 and is movable in a transverse direction perpendicular to the axial direction of the outer spindle 86.

The latch driving device 19 further includes a connecting shaft 114 between the inner operating device 20 and the outer operating device 80. The inner lug 28 and the outer lug 96 interlock with the retractor 98. The connecting shaft 114 includes an inner shaft portion 117 pivotably received in the inner spindle 26 and an outer shaft portion 119 pivotably received in the locking member 90, as shown in FIG. 3. The inner shaft portion 117 includes a coupling end 117A having non-circular cross sections. The outer shaft portion 119 includes a connecting end 119A matched with the coupling end 117A. The coupling end 117A of the inner shaft portion 117 interlocks with the connecting end 119A of the outer shaft portion 119. Thus, when the inner shaft portion 117 pivots, the outer shaft portion 119 pivots synchronously while permitting the outer shaft portion 119 to move relative to the inner shaft portion 117 in the axial direction of the outer spindle 86.

An interlocking member 131 is securely mounted on the outer shaft portion 119 and includes a distal end extending into the guiding groove 93 of the locking member 90. When the outer shaft portion 119 pivots, the interlocking member 131 pushes the locking member 90 to move in the axial direction of the outer spindle 86 between the locking position (FIG. 8) and the non-locking position (FIG. 3). Furthermore, the lock core 133 interlocks with the outer shaft portion 119, such that a key can be used to rotate the outer shaft portion 119.

Figure 6:
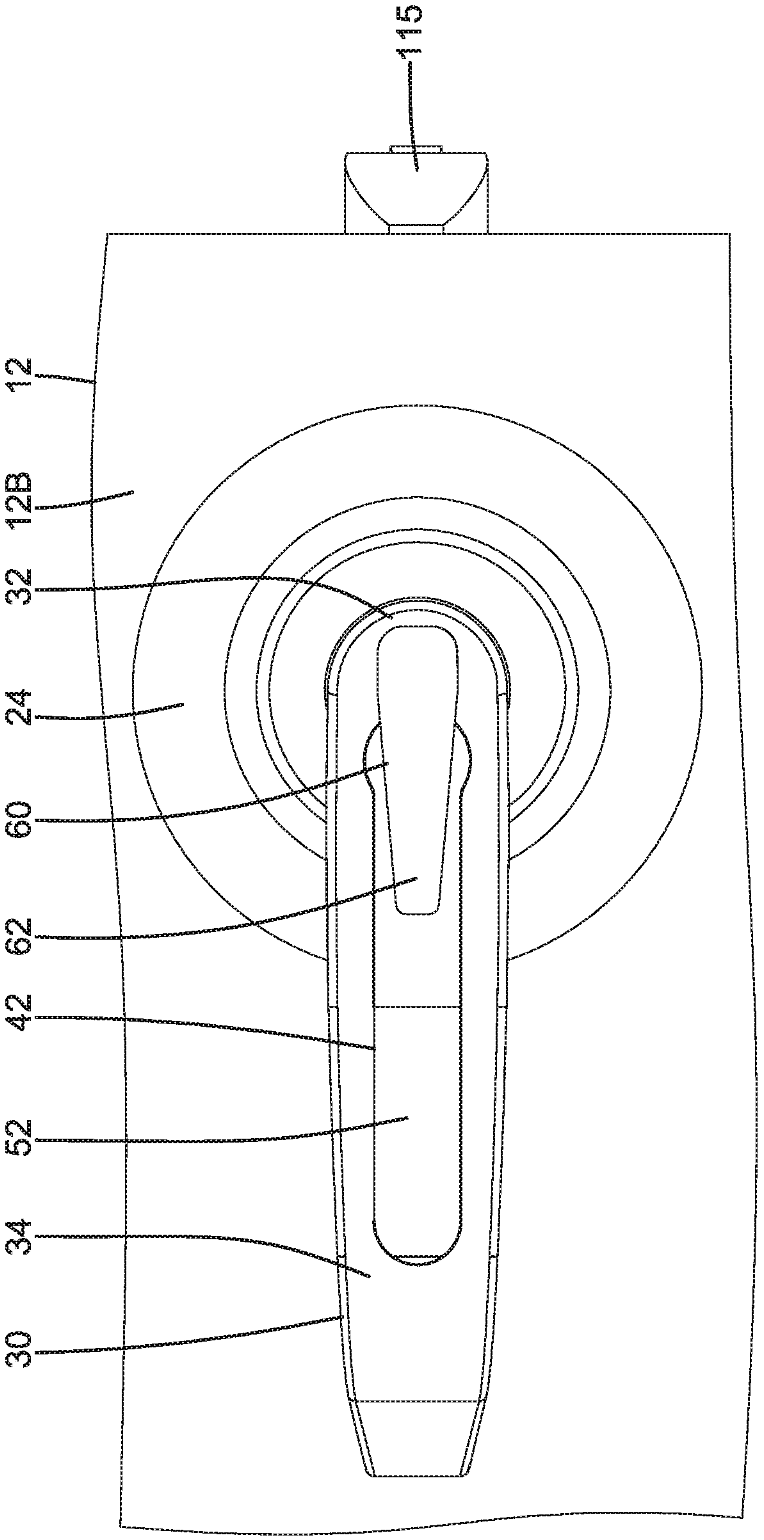
FIG. 6 is a diagrammatic side view illustrating an inner handle of the door lock in a horizontal position.
Figure 7:
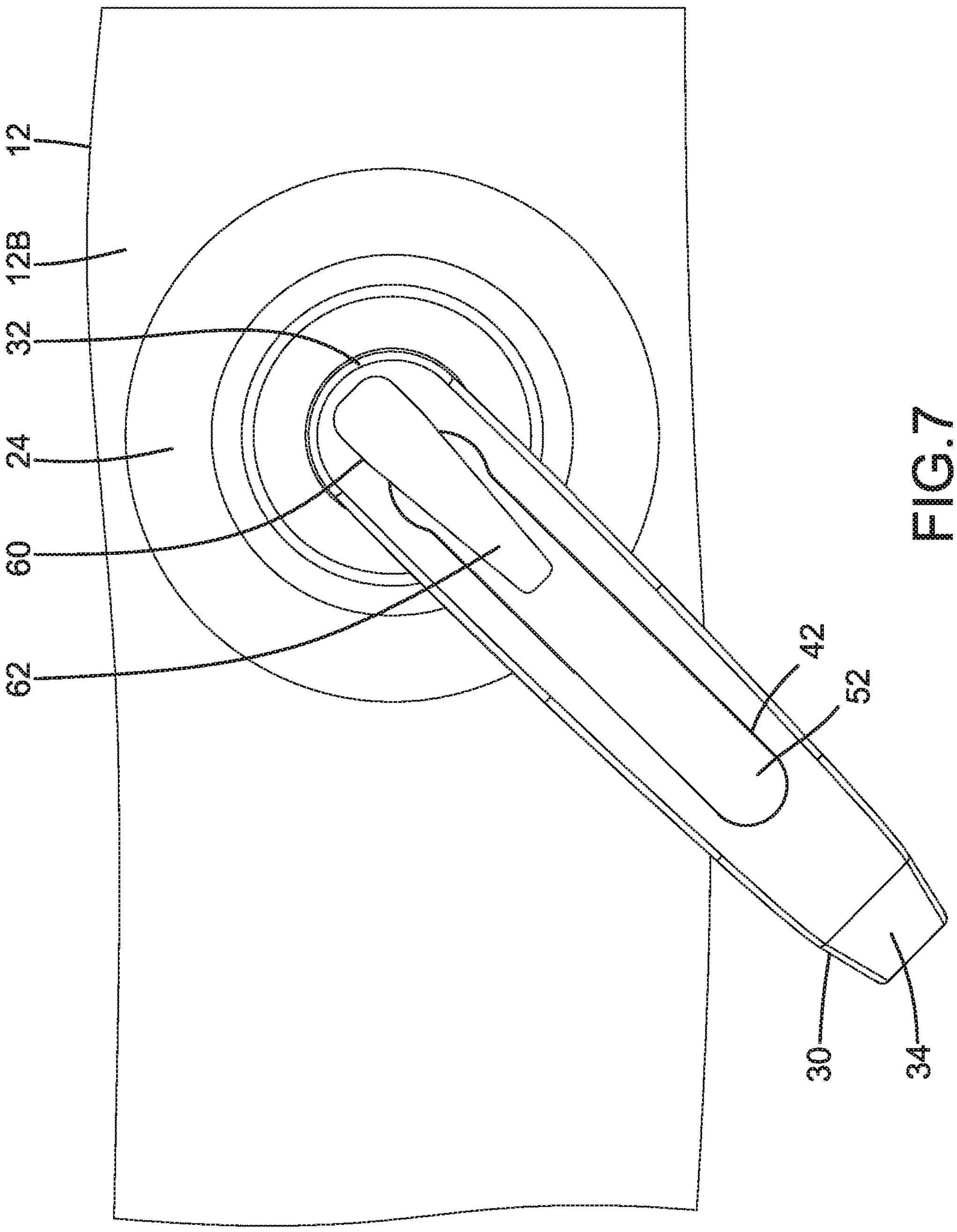
FIG. 7 is a diagrammatic side view illustrating the inner handle pivoted to an unlatching position.

The latching device 113 is securely mounted to the door 12 and interlocks with the retractor 98 of the latch driving device 19. The latching device 113 includes a latch 115 movable between an extended, latching position (FIG. 6) and a retracted, unlatching position (FIG. 7). The outer handle 111 or the inner handle 30 can be pivoted to move the latch 115 from the latching position to the unlatching position.

With reference to FIGS. 3-6, for the sake of explanation, it will be assumed that the door 12 is in the closed state, the latch 115 is in the latching position, the thumb turn 60 is in the unlatching position, and the actuator 76 is aligned with the switch 50 (FIG. 4), such that the switch 50 is set to be non-conductive. The plurality of lighting elements 48 does not generate light. A person at the inner side of the door 12 can be visually aware of this situation and, thus, can identify that the door 10 is set to the locking state. In this state, the limiting block 92 of the locking member 90 is spaced from the limiting groove 84 in the axial direction of the outer spindle 86, permitting the latch 115 to move to the unlatching position by operating the inner handle 30 or the outer handle 111. Specifically, when the inner handle 30 is turned, the inner spindle 26 pivots to displace the retractor 98 by the inner lug 28, which, in turn, moves the latch 115 from the latching position to the unlatching position through the latching device 113. When the outer handle 111 is turned, the outer spindle 86 pivots to actuate the locking member 90 and the driving member 94 to pivot. Furthermore, the outer lug 96 of the driving member 94 displaces the retractor 98 to move the latch 115 from the latching position to the unlatching position.

When the thumb turn 60 pivots from the unlocking position to the locking position while the door 12 is closed, the actuator 76 is spaced from the switch 50 about the pivot axis defined by the pivotal hole 32A. The switch 50 is set to the conductive state, such that the two batteries 49 supply electricity to the plurality of lighting elements 48 to generate light transmitting through the first lid 52. Thus, the person at the inner side of the door 12 can see the first lid 52 is illuminated to thereby identify that the door lock 10 is set to the locking state. Furthermore, when the thumb turn 60 pivots to the locking position, the connecting shaft 114 pivots together, and the interlocking member 131 moves the locking member 90 in the axial direction of the outer spindle 86 to the locking position, such that the limiting block 92 is located in the limiting groove 84 of the outer body 82, limiting pivotal movement of the limiting block 92. As a result, the driving member 94, the outer spindle 86, and the outer handle 111 cannot pivot. Namely, the door lock 10 is set to the locking state, and the latch 115 cannot move to the latching position by operating the outer handle 111.

Note that when the door lock 10 is set to the locking state, since the inner spindle 26 can pivot relative to the inner shaft portion 117 of the connecting shaft 114, the inner handle 30 can be operated to move the latch 115 to the latching position.

The lock core 133 of the door lock 10 can be set to the locking state or unlocking state. Specifically, since the lock core 133 interlocks with the outer shaft portion 119 of the connecting shaft 114, when a key is used to rotate the lock core 133, the outer shaft portion 119 pivots together with the lock core 133, moving the locking member 90 to the locking position or the unlocking position, thereby setting the door lock 10 to the locking or unlocking state. Furthermore, when the lock core 133 pivots together with the outer shaft portion 119, the inner shaft portion 117 pivots synchronously with the outer shaft portion 119. Furthermore, the inner shaft portion 117 actuate the thumb turn 60 to pivot to the locking position or the unlocking position. Thus, when the lock core 133 is used to set the door lock 10 to the locking state, the plurality of lighting elements 48 still generates light to illuminate the first lid 52.

Accordingly, the thumb turn 60 is used to control lighting of the plurality of lighting elements 48, such that the user can easily identify whether the door lock 10 is in the locking or unlocking state by sight, providing use convenience.

The locking or unlocking state of the door lock 10 can be identified by visually checking whether the first lid 52 is illuminated. In the case of safety control (such as a gunshot event) in a school or the like, students in a classroom can see whether the door 12 can be opened by the gunman outside of the classroom.

The connecting shaft 114 cooperates with the locking member 90 to permit the user to set the door lock 10 to the locking or unlocking state by using the thumb turn 60 or the lock core 133. In either case, the plurality of lighting elements 48 generate light.

Now that the basic teachings of the present invention have been explained, many extensions and variations will be obvious to one having ordinary skill in the art. For example, the switch 50 can be of a type other than the reed switch, such as a proximity switch. The actuator 76 can be a protrusion on an outer periphery of the pivotal portion 64 of the thumb turn 60. The protrusion presses against the proximity switch to control conduction of the switch 50 and to control lighting of the plurality of lighting elements 48. Furthermore, the lighting device 46 can include only one lighting element 48. Furthermore, the door lock 10 can include only one positioning member 72, and the inner handle 30 can include only two positioning grooves 32B.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A door lock comprising:

a latch driving device including an inner operating device and an outer operating device coupled with the inner operating device;

a latching device coupled with the inner operating device and the outer operating device, wherein the latching device includes a latch movable between an unlatching position and a latching position;

an outer handle operatively coupled to an outer side of the outer operating device, wherein the outer handle is pivotable to move the latch to the unlatching position;

an inner handle including a shank interlocked with the inner operating device and a lever extending from the shank, wherein the shank includes a pivotal hole extending from an end face thereof, and wherein the lever includes an outer groove in an outer surface thereof, the shank and a chamber intercommunicating with the outer groove;

a lighting device received in the chamber of the inner handle, wherein the lighting device includes a lighting element facing the outer surface and a switch controlling lighting of the lighting element;

a first lid that is transmittable to light, wherein the first lid is mounted in the outer groove, and wherein the lighting element is configured to generate light transmitting through the first lid; a thumb turn pivotably coupled with the pivotal hole of the inner handle and interlocked with the latch driving device, wherein the thumb turn includes an actuator controlling the switch to a conductive state or a non-conductive state, wherein the thumb turn is pivotable between a locking position in which the latch is not moved when the outer handle is operated and an unlocking position in which the latch is movable to the unlatching position when the outer handle is operated, wherein when the thumb turn is in the locking position, the switch is in the conductive state, and the lighting element generates light transmitting through the first lid, and wherein when the thumb turn is in the unlocking position, the switch is in the non-conductive state, and the lighting element does not generate light;

an actuator in the form of a permanent magnet, wherein the thumb turn includes a stem and a pivotal portion extending from the stem, wherein the thumb turn further includes a receptacle in the pivotal portion, wherein the actuator is securely mounted in the receptacle, wherein the switch is a reed switch, wherein when the thumb turn is in the unlocking position, the actuator is aligned with the switch, and the switch is set to the non-conductive state, and wherein when the thumb is in the locking position, the actuator is spaced from the switch in a circumferential direction about a pivotal axis defined by the pivotal hole, and the switch is set to the non-conductive state; and a positioning member, wherein the inner handle further includes two positioning grooves in an inner periphery of the pivotal hole, wherein the thumb turn further includes a receiving hole provided in the pivotal portion and spaced from the receptacle, wherein the positioning member is received in the receiving hole and is biased to move outward of the receiving hole, wherein the thumb turn is in the unlocking position, the positioning member engages with one of the two positioning grooves, thereby positioning the thumb turn in the unlocking position, and wherein when the thumb turn is in the locking position, the positioning member engages with another of the two positioning grooves, thereby positioning the thumb turn in the locking position.

2. The door lock as claimed in claim 1, further comprising a second lid, wherein the inner handle further includes an inner surface spaced from the outer surface, wherein the inner handle further includes an inner groove extending from the inner surface to the chamber, wherein the first lid further includes two engaging portions on an inner side thereof, wherein the two engaging portions extend through the chamber and abut an inner side of the second lid, and wherein two fasteners extend through the second lid and threadedly engage with the two engaging portions, respectively.

3. The door lock as claimed in claim 1, wherein the inner handle further includes a through-hole extending between the pivotal hole and the chamber, and wherein the switch of the lighting device is received in the through-hole and is spaced from the pivotal hole.

4. A door lock comprising:

an inner operating device including an inner body and an inner spindle pivotably connected to the inner body;

an outer operating device including an outer body and an outer spindle pivotably connected to the outer body, wherein the outer body further includes a limiting groove, wherein the outer operating device further includes a locking member received in the outer body and movable in an axial direction of the outer spindle and a driving member interlocked with the locking member, wherein the locking member includes a limiting block, wherein the locking member is movable in the axial direction of the outer spindle between a non-locking position in which the limiting block disengages from the limiting groove and a locking position in which the limiting block engages with the limiting groove; a retractor movable in a transverse direction perpendicular to the axial direction of the outer spindle, wherein rotation of the inner spindle or the outer spindle moves the retractor;

a latching device interlocked with the retractor, wherein the latching device includes a latch movable between a latching position and an unlatching position, and wherein movement of the retractor causes movement of the latch to the latching position or the unlatching position;

a connecting shaft received in the inner body and the outer body, wherein the connecting shaft interlocks with the locking member, wherein pivotal movement of the connecting shaft causes movement of the locking member to the locking position or the unlocking position;

an outer handle coupled with the outer spindle; an inner handle including a shank and a lever extending from the shank, wherein the shank includes a pivotal hole extending from an end face thereof, and wherein the lever includes an outer groove in an outer surface thereof and a chamber intercommunicating with the outer groove;

a lighting device received in the chamber of the inner handle, wherein the lighting device includes a lighting element facing the outer surface and a switch controlling lighting of the lighting element;

a first lid that is transmittable to light, wherein the first lid is mounted in the outer groove, and wherein the lighting element is configured to generate light transmitting through the first lid;

a thumb turn pivotably coupled with the pivotal hole of the inner handle, wherein the thumb turn includes an actuator controlling the switch to a conductive state or a non-conductive state, wherein the thumb turn further includes a driving end interlocked with the connecting shaft, wherein pivotal movement of the thumb turn causes movement of the connecting shaft to control the locking member to the locking position or the unlocking position, wherein when the locking member is in the locking position, the switch is in the conductive state, and the lighting element generates light transmitting through the first lid, and wherein when the locking member is in the unlocking position, the switch is in the non-conductive state, and the lighting element does not generate light;

wherein the actuator is in the form of a permanent magnet, wherein the thumb turn includes a stem and a pivotal portion extending from the stem, wherein the thumb turn further includes a receptacle in the pivotal portion, wherein the actuator is securely mounted in the receptacle, wherein the switch is a reed switch, wherein when the thumb turn is in the unlocking position, the actuator is aligned with the switch, the switch is set to the non-conductive state, and wherein when the thumb turn is in the locking position, the actuator is spaced from the switch in a circumferential direction about a pivotal axis defined by the pivotal hole, and the switch is set to the non-conductive state; and a positioning member, wherein the inner handle further includes two positioning grooves in an inner periphery of the pivotal hole, wherein the thumb turn further includes a receiving hole provided in the pivotal portion and spaced from the receptacle, wherein the positioning member is received in the receiving hole and is biased to move outward of the receiving hole, wherein the thumb turn is in the unlocking position, the positioning member engages with one of the two positioning grooves, thereby positioning the thumb turn in the unlocking position, and wherein when the thumb turn is in the locking position, the positioning member engages with another of the two positioning grooves, thereby positioning the thumb turn in the locking position.

5. The door lock as claimed in claim 4, wherein the connecting shaft includes: an inner shaft portion pivotably received in the inner spindle and including a coupling end, wherein the driving end of the thumb turn interlocks with the inner shaft portion;

an outer shaft portion pivotably received in the locking member and movable in the axial direction of the outer spindle, wherein the outer shaft portion includes a connecting end interlocked with the coupling end of the inner shaft portion, wherein the outer shaft portion interlocks with the locking member, and wherein the locking member further includes a guiding groove in an outer periphery thereof; and an interlocking member including an end coupled to the outer spindle portion and another end received in the guiding groove of the locking member, wherein when the outer spindle portion pivots, the interlocking member is actuated to move the locking member, wherein a lock core is mounted to the outer handle and interlocked with the outer spindle portion, wherein when the lock core is rotated, the outer spindle portion is pivoted.

6. The door lock as claimed in claim 4, further comprising a second lid, wherein the inner handle further includes an inner surface spaced from the outer surface, wherein the inner handle further includes an inner groove extending from the inner surface to the chamber, wherein the first lid further includes two engaging portions on an inner side thereof, wherein the two engaging portions extend through the chamber and abut an inner side of the second lid, and wherein two fasteners extend through the second lid and threadedly engage with the two engaging portions, respectively.

* * * * *